United States Patent
Li et al.

(10) Patent No.: US 10,498,786 B2
(45) Date of Patent: Dec. 3, 2019

(54) METHOD AND APPARATUS FOR ADAPTIVELY PROVIDING MULTIPLE BIT RATE STREAMING MEDIA IN SERVER

(71) Applicant: Beijing Baidu Netcom Science and Technology Co., Ltd., Beijing (CN)

(72) Inventors: Yongxing Li, Beijing (CN); Huifeng Shen, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 159 days.

(21) Appl. No.: 15/430,167

(22) Filed: Feb. 10, 2017

(65) Prior Publication Data

US 2018/0084020 A1    Mar. 22, 2018

(30) Foreign Application Priority Data

Sep. 20, 2016    (CN) .......................... 2016 1 0835828

(51) Int. Cl.
*G06F 15/16*    (2006.01)
*H04L 29/06*    (2006.01)
*H04L 12/26*    (2006.01)

(52) U.S. Cl.
CPC ...... *H04L 65/4092* (2013.01); *H04L 43/0894* (2013.01); *H04L 43/16* (2013.01);
(Continued)

(58) Field of Classification Search
CPC . H04L 65/607; H04L 65/602; H04L 65/4076; H04L 65/80; H04L 65/601
See application file for complete search history.

(56) References Cited

U.S. PATENT DOCUMENTS

2005/0254508 A1*   11/2005   Aksu ..................... H04L 1/0009
                                                              370/428
2006/0088094 A1     4/2006   Cieplinski
(Continued)

FOREIGN PATENT DOCUMENTS

CN          101771492 A      7/2010
CN          103686167 A      3/2014
(Continued)

OTHER PUBLICATIONS

Hsu, C.-Y. et al., "Rate Control for Robust Video Transmission over Burst-Error Wireless Channels," IEEE Journal on Selected Areas in Communications, vol. 17, No. 5, May 1999, pp. 756-773 (20 pages).

(Continued)

*Primary Examiner* — Padma Mundur
(74) *Attorney, Agent, or Firm* — Nixon Peabody LLP

(57) ABSTRACT

A method and apparatus for adaptively providing multiple bit rate streaming media in a server. The method for adaptively providing multiple bit rate streaming media comprises: acquiring network quality information; in the case that it is determined based on the network quality information that bit rate switching is needed, selecting one queue from all queues as the transmitting queue, wherein multimedia data frames with different bit rates for the same media content are stored in different queues; reading the multimedia data frame from the transmitting queue and sending it, and deleting all multimedia data frames in other queues having the same media content as the already-sent multimedia data frame. The technical solutions provided by the present disclosure reduces bit rate switching delay while implementing adaptive bit rate switching, and implements quick and seamless adaptive bit rate switching.

18 Claims, 2 Drawing Sheets

(52) U.S. Cl.
CPC ........ *H04L 65/4076* (2013.01); *H04L 65/601* (2013.01); *H04L 65/602* (2013.01); *H04L 65/607* (2013.01); *H04L 65/80* (2013.01)

(56) References Cited

U.S. PATENT DOCUMENTS

| | | | | |
|---|---|---|---|---|
| 2011/0066673 | A1* | 3/2011 | Outlaw | H04L 65/4092 709/203 |
| 2011/0225315 | A1* | 9/2011 | Wexler | H04L 65/4076 709/231 |
| 2011/0305273 | A1* | 12/2011 | He | H04N 19/30 375/240.02 |
| 2016/0164759 | A1 | 6/2016 | Satoda | |

FOREIGN PATENT DOCUMENTS

| | | |
|---|---|---|
| CN | 103747296 A | 4/2014 |
| CN | 104796732 A | 7/2015 |
| JP | H5-327836 A | 12/1993 |
| JP | 2000-228765 A | 8/2000 |
| JP | 2001177828 A | 6/2001 |
| JP | 2002-077280 A | 3/2002 |
| JP | 2006-087125 A | 3/2006 |
| JP | 2011-040879 A | 2/2011 |
| KR | 10-0924309 B2 | 10/2009 |
| WO | WO 2014/207978 A1 | 12/2014 |

OTHER PUBLICATIONS

Noda, R. et al., Proceedings from Multicarrier Signal Processing Techniques Session, Communications Society, Institute of Electronics, Information and Communication Engineers Convention, Sep. 23-26, 2003, Niigata University, Niigata, Japan (5 pages) (w/English abstract).

* cited by examiner

METHOD AND APPARATUS FOR ADAPTIVELY PROVIDING MULTIPLE BIT RATE STREAMING MEDIA IN SERVER

CROSS-REFERENCE TO RELATED APPLICATION

This application claims priority to Chinese Patent Application No. 201610835828.8, entitled "Method And Apparatus For Adaptively Providing Multiple Bit Rate Streaming Media In Server," filed on Sep. 20, 2016, the content of which is incorporated herein by reference in its entirety.

TECHNICAL FIELD

The present disclosure relates to network technologies, and particularly to a method for adaptively providing multiple bit rate streaming media in a server, and an apparatus for adaptively providing multiple bit rate streaming media in a server.

BACKGROUND

Streaming media technology may be used to transmit media content such as audio and video in a streaming fashion in a network. Characterized by strong real-time performance, the streaming media technology is extensively used in systems such as video-on-demand, video conference, distance education, remote medical care and live broadcast.

There are usually two kinds of approaches to provide multiple bit rate streaming media service by a streaming media server:

First approach: a user selects a play option such as "smooth," "standard" and "high definition" based on the network situation, and the server provides the user with a media stream having a bit rate corresponding to the play option selected by the user.

Second approach: HLS (HTTP Live Streaming) is used to adaptively provide the user with multiple bit rate streaming. Specifically, the streaming media sent by the streaming media server to the user is formed by a video clip, and each video clip comprises multimedia data that may play 10-second media content, and the multi-media server may adaptively provide the user with media streaming with a different bit rate based on the network quality.

During the implementation of the present disclosure, the inventor finds that, as the above first approach pushes the media streaming with a bit rate to the user corresponding to the play option selected by the user, the first approach cannot adaptively provide the user with multiple bit rate streaming media, and is deficient in intelligence. In addition, the user usually changes the play option when the play is under abnormal situations such as pausing or mosaic. Hence, the above first approach undesirably affects the user experience. The above second approach can solve the technical problem existed in the first approach, but the play duration of a video clip in the second approach may cause a noticeable delay when the bit rate is switched.

SUMMARY

The present disclosure provides a method and apparatus for adaptively providing multiple bit rate streaming media in a server.

According to one aspect of the present disclosure, there is provided a method for adaptively providing multiple bit rate streaming media in a server, comprising: acquiring network quality information; selecting a queue from queues as a transmitting queue, after determining a need to switch a bit rate based on the network quality information, the queues storing multimedia data frames with different bit rates for identical media content; reading the multimedia data frame from the transmitting queue, sending the multimedia data frame, and deleting multimedia data frames in other queues having the identical media content as the sent multimedia data frame.

According to another aspect of the present disclosure, there is provided an apparatus for adaptively providing multiple bit rate streaming media in a server, comprising: means for obtaining network quality information; means for selecting a queue from queues as a transmitting queue, after determining a need to switch a bit rate based on the network quality information, the queues storing multimedia data frames with different bit rates for identical media content; means for reading the multimedia data frame from the transmitting queue, sending the multimedia data frame, and deleting multimedia data frames in other queues having the identical media content as the sent multimedia data frame.

As compared with the prior art, the present disclosure has the following advantages: in the present disclosure, a plurality of queues are arranged, each queue corresponds to a different code, and multimedia data frames with different bit rates for the same media content may be respectively arranged in different queues. As such, when it is determined based on the network quality information that the bit rate switching is needed, one queue corresponding to the bit rate batter matched with the current network quality is selected from all queues, and the multimedia data frame is read and sent from the selected queue to quickly implement code switching; in the present disclosure, corresponding multimedia data frames in respective queues are deleted with respect to the currently-sent multimedia data frames, so that the multimedia data frames located at head of respective queues all are multimedia data frames with different bit rates for the same media content. As such, whenever it is determined that the bit rate switching is needed, the present disclosure can quickly implement the bit rate switching in time, and meanwhile ensures that the bit rate switching operation does not affect coherence of the media content; as known from the above, the technical solutions provided by the present disclosure reduces bit rate switching delay while implementing adaptive bit rate switching, and implements quick and seamless adaptive bit rate switching.

BRIEF DESCRIPTION OF THE DRAWINGS

Other features, objectives and advantages of the present disclosure will be made more apparent by reading through detailed description of unrestrictive embodiments with reference to the following figures.

DETAILED DESCRIPTION OF EMBODIMENTS

Figure 1:
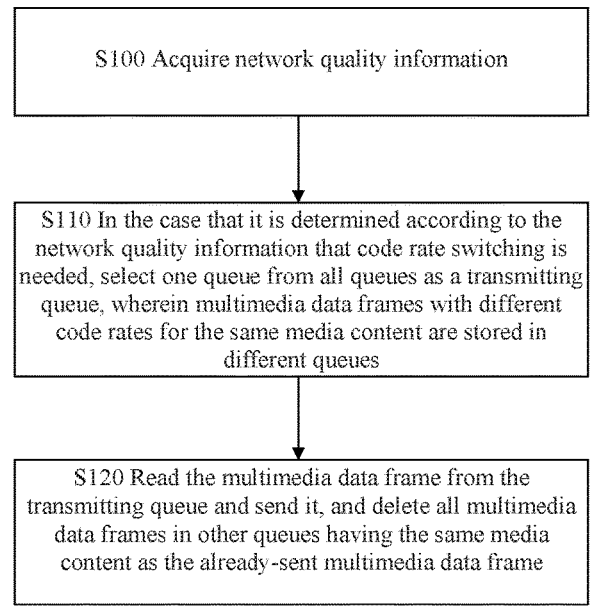
FIG. 1 is a flow chart of a method for adaptively providing multiple bit rate streaming media in a server according to a first embodiment of the present disclosure.

Before exemplary embodiments are discussed in more detail, it should be noted that some exemplary embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

The "computing device" mentioned in the context, also referred to as "computer", refers to a smart electronic device that can execute a predetermined processing procedure such as numerical calculation and/or logical calculation by running a predetermined program or instruction, and may include a processor and a memory. The processor executes a program instruction pre-stored in the memory to execute the predetermined processing procedure, or hardware such as an ASIC, an FPGA, or a DSP executes the predetermined processing procedure, or the predetermined processing procedure is implemented by a combination of the two. The computing device includes, but is not limited to, a server, a personal computer (PC), a notebook computer, a tablet computer, a smart phone, and the like.

The computing device, for example, includes user equipment and a network devices. The user equipment includes, but is not limited to, a personal computer (PC), a notebook computer, a mobile terminal, and the like. The mobile terminal includes, but is not limited to, a smart phone, a PDA, and the like. The network device includes, but is not limited to, a single network server, a server group consisting of multiple network servers, or a cloud-computing-based cloud having numerous computers or network servers, where the cloud computing is one of the distributed computing technologies, or a virtual super computer having a group of loosely-coupled computers. The computing device may run alone to implement the present disclosure, or may connect to a network and implement the present disclosure by means of interaction operations with other computing devices in the network. The network where the computing device is located includes, but is not limited to, the Internet, a wide area network, a metropolitan area network, a local area network, a VPN network, and the like.

It should be noted that, the user equipment, network device, and network are merely examples, and if applicable to the present disclosure, other existing or possible computing devices or networks in the future should also be included in the protection scope of the present disclosure, and incorporated herein by reference.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments for performing the necessary tasks may be stored in a machine or computer readable medium such as a storage medium. One or more processors may implement the necessary tasks.

Specific structural and functional details disclosed herein are merely representative for purposes of describing example embodiments of the present disclosure. This disclosure may, however, be embodied in many alternate forms and should not be construed as limited to only the embodiments set forth herein.

It should be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the accompanying figures. For example, two figures shown in succession may in fact be executed concurrently or may sometimes be executed in the reverse order, depending upon the functionality/acts involved.

The present disclosure will be described in detail with reference to figures.

Embodiment 1 provides a method for adaptively providing multiple bit rate streaming media in a server.

In the present embodiment, a plurality of queues are used to provide the user with adaptive multiple bit rate streaming media service, and the number of queues applies to the number of the bit rate. The method of the present embodiment is executed by a streaming media server. The queues in the present embodiment refer to a segment of storage space which is capable of storing a plurality of multimedia data frames stored sequentially logically, e.g., queues in the present embodiment may be implemented in a manner such as a linked list or FIFO (First Input First Output) queue.

FIG. 1 shows a flow chart of a method for adaptively providing multiple bit rate streaming media in a server in the present embodiment. In FIG. 1, the method according to the present embodiment mainly comprises: S100, S110 and S120.

S100: acquiring network quality information.

In an example, the network quality information in the present embodiment may comprise: network transmission delay, packet loss rate, and network jitter information. Preferably, the network quality information in the present embodiment may be reflected using data fill information of the queue, and the data fill information of the queues represents information of storage situations of data in the queues.

In an example, the data fill information of the queues in the present embodiment may be specifically a ratio (may also called a proportion or percentage, and may be collectively called a data fill rate of the queue) of a storage space size occupied by the multimedia data frame stored in the queue to a total storage space size, and the data fill information of the queue may specifically be a queue parameter capable of reflecting network quality, such as the storage space size occupied by the multimedia data frame stored in the queue or the storage space size that is idle in the queue.

In an example, in the present embodiment it is feasible to acquire regularly (e.g., one second or less than one second) the data fill information of any one queue in all queues to acquire a current network state in time based on the data fill information of the queues. Said any one queue may be a randomly-determined queue or a predetermined fixed queue. That is, in the present embodiment it is feasible to randomly acquire data fill information of a certain queue, or fixedly acquire the data fill information of a certain queue (e.g., a first queue or a second queue). Preferably, in the present embodiment it is feasible to acquire regularly the data fill information (e.g., data fill rate of the queues) of a transmitting queue among the queues, to acquire the current network state in time based on the data fill information of the transmitting queue. In the present embodiment, the transmitting queue refers to a queue to which a multimedia data frame currently sent to the terminal equipment belongs. That is to say, although in the present embodiment a corresponding queue is respectively set for the multimedia data frame for different bit rates, and each queue stores the multimedia data frame with the corresponding bit rate, but, as for any moment, the multimedia data frame stored in one queue is transmitted to the terminal equipment and the queue is the transmitting queue.

S110: in the case that a need to perform bit rate switching is determined based on the network quality information, selecting one queue from all queues as the transmitting queue.

In an example, in the present embodiment a plurality of queues are arranged, each queue corresponds to a bit rate, and different queues correspond to different bit rates. Each queue stores a multimedia data frame, and media content corresponding to the multimedia data frame located at the head of each of all queues is completely the same; in a preferred approach, media content of the multimedia data frame stored in all queues is completely the same, namely, the multimedia data frame stored in all queues is synchronous from the perspective of media content. That is to say, as far as the same media content is concerned, the multimedia data frame with a different bit rate is arranged in a different queue. In the present embodiment, the multimedia content may be video image, and the same media content is the same video image.

In an example, a size of the storage space of all queues in the present embodiment is usually distinct, and the number of multimedia data frames that can be stored in the storage space of all queues is usually the same. In the case that the number of multimedia data frames that can be stored in the storage space of all queues is the same in the present embodiment, since different queues store multimedia data frames with different bit rates and the storage space occupied by the multimedia data frame with different bit rates is distinct, the size of the storage space of all queues in the present embodiment is distinct, and the size of the storage space corresponding to the queue with a higher bit rate is higher than the size of the storage space corresponding to the queue with a lower bit rate. Certainly, in the present embodiment, a possibility that all queues have the same storage space cannot be excluded. The storage space of each queue may be set according to actual needs. However, the size of the storage space of each queue is not less than the storage space occupied by two multimedia data frames, namely, each queue can at least store two multimedia data frames. In the present embodiment, multimedia data frames may comprise a key frame and a non-key frame corresponding to the key frame.

In an example, in the present embodiment the multimedia data frame stored in the queues may employ a GOP (Group of Picture) structure. For example, in the case that the multimedia data frame in the present embodiment employs the multimedia data frame in an encoding format based on MPEG (Moving Picture Experts Group), one I frame (namely, internal encoding frame, also called a key frame), a plurality of P frames (namely, forward prediction frame) and a plurality of B frames (namely, bidirectional interpolation frame) form a GOP, and a GOP is a multimedia data frame. The key frame (e.g., I frame) in the multimedia data frame in the present embodiment is usually a complete picture, and other frames (e.g., P frame and B frame) are mainly used to record a change relative to the key frame. Without the key frame, P frame and B frame cannot decode.

In an example, all multimedia data frames stored in different queues in the present embodiment have the same encoding format, for example, all multimedia data frames stored in different queues have the same GOP structure. In addition, multimedia data frames stored in different queues are synchronously updated, for example, multimedia data frames for the same media content are simultaneously deleted; again for example, in the case that multimedia data frames for the same media content in queues are simultaneously deleted, multimedia data frames for the same media content are simultaneously increased at the same time. Certainly, a possibility of increasing multimedia data frames for the same media content in the queues in a non-synchronous approach is not excluded in the present embodiment, but it is requisite to simultaneously delete the multimedia data frames for the same media content to ensure that the media content corresponding to multimedia data frames located at the head of all queues is completely the same.

In an example, a specific example of simultaneously increasing the multimedia data frames for the same media content in respective queues in the present embodiment is as follows: in the present embodiment each bit rate is provided with a buffer; for example, in the case that the multimedia data frames employs a GOP structure, each type of bit rate is provided with a GOP buffer in the present embodiment; first, transcoding processing is performed for the multimedia data frames after having gone through encoding processing (e.g., for multimedia data frames after MPEG encoding processing) to obtain multimedia data frames with a plurality of different bit rates; then, multimedia data frames with different bit rates are simultaneously written into the corresponding GOP buffer, for example, in the case that all GOP buffers are empty (GOP buffers are made empty since the multimedia data frames in the GOP buffers are placed in the queues, or GOP buffers are made empty due to a cleaning operation), the multimedia data frames with different bit rates after the transcoding processing are simultaneously written into the corresponding GOP buffers; then, the same number of multimedia data frames are simultaneously read from respective GOP buffers, the same number of read multimedia data frames are respectively stored in corresponding queues so that the multimedia data frame for the same media content are simultaneously increased in respective queues.

In an example, the network quality information in the present embodiment comprises a data fill rate of queues, and in the case that the number of multimedia data frames that can be stored in respective storage spaces of all queues is the same, a procedure of determining that bit rate switching is needed based on the network quality information in the present embodiment may be: pre-setting two uniform thresholds for all queues, namely, a first threshold and a second threshold, obtaining a total storage space size of respective queues from pre-maintained information, and obtaining regularly a total storage space size occupied by all multimedia data frames currently stored in any queue of all queues (e.g., obtaining regularly a total storage space size occupied by all multimedia data frames currently stored in a transmitting queue), then, calculating the data fill rate of the queue based on the total storage space size occupied by all multimedia data frames currently stored in the obtained queue and the total storage space size of the queue, and determining that it is necessary to switch to a lower bit rate when the data fill rate of the queue is judged higher than the first threshold; determining that it is necessary to switch to a higher bit rate when the data fill rate of the queue is judged lower than the second threshold. The first threshold is usually by far larger than the second threshold, e.g., the first threshold is 80%, whereas the second threshold is 20%.

In an example, the network quality information in the present embodiment comprises a data fill rate of queues, and in the case that the number of multimedia data frames that can be stored in respective storage spaces of all queues is different, a procedure of determining that bit rate switching is needed based on the network quality information in the present embodiment may be: pre-setting two thresholds for each queue respectively, i.e., each queue corresponds to its respective first threshold and second threshold, first thresholds to which different queues correspond respectively are usually different, and likewise, second thresholds to which different queues correspond respectively are usually different; obtaining, from pre-maintained information, a total storage space size of each queue and a first threshold and a second threshold to which each queue itself corresponds, and obtaining regularly a total storage space size occupied by all multimedia data frames currently stored in any queue of all queues (e.g., obtaining regularly a total storage space size occupied by all multimedia data frames currently stored in a transmitting queue), then, calculating the data fill rate of the queue based on the total storage space size occupied by all multimedia data currently stored in the obtained queue and the total storage space size of the queue, and determining that it is necessary to switch to a lower bit rate when the data fill rate of the queue is judged higher than the first threshold to which the queue corresponds; determining that it is necessary to switch to a higher bit rate when the data fill rate of the queue is judged lower than the second threshold to which the queue corresponds. The first threshold is usually by far larger than the second threshold, e.g., the first threshold is 80%, whereas the second threshold is 20%.

In an example, in the case that the network quality information in the present embodiment comprises a total storage space size occupied by all multimedia data frames currently stored in a queue, a procedure of determining that bit rate switching is needed based on the network quality information in the present embodiment may be: no matter whether the number of multimedia data frames that can be stored in respective storage spaces of all queues is the same, pre-setting two thresholds for each queue, i.e., each queue corresponds to its respective third threshold and fourth threshold, third thresholds to which different queues correspond are usually different, and likewise, fourth thresholds to which different queues correspond are usually different; obtaining, from pre-maintained information, a third threshold and a fourth threshold to which each queue itself corresponds, and obtaining regularly a total storage space size occupied by all multimedia data frames currently stored in any queue of all queues (e.g., obtaining regularly a total storage space size occupied by all multimedia data frames currently stored in a transmitting queue), then, comparing the total storage space size occupied by all multimedia data frames currently stored in the obtained queue with the third threshold and fourth threshold to which the queue corresponds, and determining that it is necessary to switch to a lower bit rate when the comparison result is that the total storage space size occupied by all multimedia data frames currently stored in the obtained queue is larger than the third threshold to which the queue corresponds; and determining that it is necessary to switch to a higher bit rate when the comparison result is that the total storage space size occupied by all multimedia data frames currently stored in the obtained queue is smaller than the fourth threshold to which the queue corresponds. The third threshold is usually by far larger than the fourth threshold.

In an example, in the case that the network quality information in the present embodiment comprises a storage space size currently idle in the queue, a procedure of determining that bit rate switching is needed based on the network quality information in the present embodiment may be: no matter whether the number of multimedia data frames that can be stored in respective storage spaces of all queues is the same, pre-setting two thresholds for each queue, i.e., each queue corresponds to its respective fifth threshold and sixth threshold, fifth thresholds to which different queues correspond respectively are usually different, and likewise, sixth thresholds to which different queues correspond respectively are usually different; obtaining, from pre-maintained information, a fifth threshold and a sixth threshold to which each queue itself corresponds, and obtaining regularly a storage space size currently idle in each queue in all queues (e.g., obtaining regularly a storage space size currently idle in a transmitting queue), and comparing the storage space size currently idle in the obtained queue with the fifth threshold and sixth threshold to which the queue corresponds, and determining that it is necessary to switch to a higher bit rate when the comparison result is that the storage space size currently idle in the obtained queue is larger than the obtained fifth threshold; and determining that it is necessary to switch to a lower bit rate when the comparison result is that the storage space size currently idle in the obtained queue is smaller than the sixth threshold. The fifth threshold is usually by far smaller than the sixth threshold.

In an example, to avoid frequent bit rate switching phenomenon caused by factors such as network jitter, upon judging it is necessary to switch bit rate, the present embodiment may increase constraint conditions for controlling frequent bit rate switching, that is to say, in the present embodiment, it is feasible to determine that the bit rate needs to be switched based on the network quality information and pre-set time constraint conditions for bit rate switching. The pre-set time constraint conditions for bit rate switching may specifically be that a time period from a preceding bit rate switching to current time exceeds a predetermined time length.

In an example, a first specific example of determining that the bit rate needs to be switched based on the network quality information and the pre-set time constraint conditions for bit rate switching is: in the case that the number of multimedia data frames that can be stored in respective storage spaces of all queues is the same, pre-setting two uniform thresholds for all queues, namely, a first threshold and a second threshold, obtaining a total storage space size, a predetermined time length and time of the preceding bit rate switching from pre-maintained information, and obtaining regularly a total storage space size occupied by all multimedia data frames currently stored in any queue of all queues, then, calculating the data fill rate of the queue based on the total storage space size occupied by all multimedia data frames currently stored in the obtained any queue and the total storage space size of the queue, and determining that it is necessary to switch to a lower bit rate when the data fill rate is judged higher than the first threshold and when a difference between the current time and the time of preceding bit rate switching exceeds a predetermined time length; determining that it is necessary to switch to a higher bit rate when the data fill rate is judged lower than the second threshold and when a difference between the current time and the time of preceding bit rate switching exceeds a predetermined time length.

In an example, a second specific example of determining that the bit rate needs to be switched based on the network quality information and the pre-set time constraint conditions for bit rate switching is: in the case that the number of multimedia data frames that can be stored in respective storage spaces of all queues is different, pre-setting two thresholds for each queue respectively, i.e., each queue corresponds to its respective first threshold and second threshold, first thresholds to which different queues correspond respectively are usually different, and likewise, second thresholds to which different queues correspond respectively are usually different; obtaining, from pre-maintained information, a total storage space size of each queue, a first threshold and a second threshold to which each queue itself corresponds, a predetermined time length and time of the preceding bit rate switching, and obtaining regularly a total storage space size occupied by all multimedia data frames currently stored in any queue of all queues (preferably, obtaining regularly a total storage space size occupied by all multimedia data frames currently stored in a transmitting queue), then, calculating the data fill rate of the queue based on the total storage space size occupied by all multimedia data currently stored in the obtained queue and the total storage space size of the queue, and determining that it is necessary to switch to a lower bit rate when the data fill rate is judged higher than the first threshold to which the queue corresponds and when a difference between the current time and the time of preceding bit rate switching exceeds a predetermined time length; determining that it is necessary to switch to a higher bit rate when the data fill rate is judged lower than the second threshold to which the queue corresponds and when the difference between the current time and the time of preceding bit rate switching exceeds a predetermined time length. The first threshold is usually by far larger than the second threshold, e.g., the first threshold is 80%, whereas the second threshold is 20%.

In an example, a third specific example of determining that the bit rate needs to be switched based on the network quality information and the pre-set time constraint conditions for bit rate switching is: pre-setting two thresholds for each queue, i.e., each queue corresponds to its respective third threshold and fourth threshold, third thresholds to which different queues correspond are usually different, and likewise, fourth thresholds to which different queues correspond are usually different; obtaining, from pre-maintained information, a third threshold and a fourth threshold to which each queue itself corresponds, a predetermined time length and time of the preceding bit rate switching, and obtaining regularly a total storage space size occupied by all multimedia data frames currently stored in any queue of all queues (preferably, obtaining regularly a total storage space size occupied by all multimedia data frames currently stored in a transmitting queue), then, comparing the total storage space size occupied by all multimedia data frames currently stored in the obtained queue with the third threshold and fourth threshold to which the queue corresponds, and determining that it is necessary to switch to a lower bit rate when the comparison result is that the total storage space size occupied by all multimedia data frames currently stored in the obtained queue is larger than the third threshold to which the queue corresponds and when the difference between the current time and the time of preceding bit rate switching exceeds a predetermined time length; and determining that it is necessary to switch to a higher bit rate when the comparison result is that the total storage space size occupied by all multimedia data frames currently stored in the obtained queue is smaller than the fourth threshold to which the queue corresponds and when the difference between the current time and the time of preceding bit rate switching exceeds a predetermined time length. The third threshold is usually by far larger than the fourth threshold.

In an example, a fourth specific example of determining that the bit rate needs to be switched based on the network quality information and the pre-set time constraint conditions for bit rate switching is: pre-setting two thresholds for each queue, i.e., each queue corresponds to its respective fifth threshold and sixth threshold, fifth thresholds to which different queues correspond respectively are usually different, and likewise, sixth thresholds to which different queues correspond respectively are usually different; obtaining, from pre-maintained information, a fifth threshold and a sixth threshold to which each queue itself corresponds, a predetermined time length and time of the preceding bit rate switching, and obtaining regularly a storage space size currently idle in each queue in all queues (preferably, obtaining regularly a storage space size currently idle in a transmitting queue), and comparing the storage space size currently idle in the obtained queue with the fifth threshold and sixth threshold to which the queue corresponds, and determining that it is necessary to switch to a higher bit rate when the comparison result is that the storage space size currently idle in the obtained queue is larger than the obtained fifth threshold and when the difference between the current time and the time of preceding bit rate switching exceeds a predetermined time length; and determining that it is necessary to switch to a lower bit rate when the comparison result is that the storage space size currently idle in the obtained queue is smaller than the sixth threshold and when the difference between the current time and the time of preceding bit rate switching exceeds a predetermined time length. The fifth threshold is usually by far smaller than the sixth threshold.

It needs to be particularly appreciated that in the present embodiment, when it is determined that it is necessary to switch to a lower bit rate, if the bit rate of the transmitting queue before the switching is already a minimum bit rate among bit rates of all queues, a new transmitting queue after the switching is still the transmitting queue before the switching; if the bit rate of the transmitting queue before the switching is not a minimum bit rate among bit rates of all queues, a queue should be selected from all queues whose bit rates are lower than the bit rate of the transmitting queue before the switching as the transmitting queue, e.g., a queue with a minimum bit rate should be selected from all queues whose bit rates are lower than the bit rate of the transmitting queue before the switching as the transmitting queue. When it is determined that it is necessary to switch to a higher bit rate in the present embodiment, if the bit rate of the transmitting queue before the switching is already a maximum bit rate among bit rates of all queues, a new transmitting queue after the switching is still the transmitting queue before the switching; if the bit rate of the transmitting queue before the switching is not a maximum bit rate among bit rates of all queues, a queue should be selected from all queues whose bit rates are higher than the bit rate of the transmitting queue before the switching as the transmitting queue, e.g., a queue with a maximum bit rate should be selected from all queues whose bit rates are higher than the bit rate of the transmitting queue before the switching as the transmitting queue S120: reading the multimedia data frame from the transmitting queue and sending it, and deleting all multimedia data frames in other queues having the same media content as the already-sent multimedia data frame.

In an example, in the case that bit rate switching is not needed, in the present embodiment the multimedia data frame is always read and sent from the transmitting queue, and the multimedia data frame read and sent by the transmitting queue is deleted from the transmitting queue; in the case that it is determined that bit rate switching is needed, the multimedia data frame should be read and sent from a new transmitting queue after the switching in the present embodiment.

In an example, when the multimedia data frame is read and sent from the transmitting queue, in the present embodiment corresponding multimedia data frames in other queues (namely, all remaining queues among all queues except for the transmitting queue) should be synchronously deleted to ensure multimedia data frames at head of all queues always correspond to the same media content.

In an example, in the case that it is determined that bit rate switching is needed, timing of reading and sending from the new transmitting queue after the switching should be noted in the present embodiment. Specifically, in the case that it is determined that bit rate switching is needed, in the present embodiment when a key frame (e.g., I frame) needs to be read from the transmitting queue before the switching, it is requisite to stop reading and sending the multimedia data frames from the transmitting queue before the switching, and read and send the multimedia data frames from the transmitting queue after the switching; In a specific example, when it is determined that bit rate switching is needed, if a non-key frame (e.g., P frame or B frame) is being currently read and sent from the transmitting queue before the switching, wait until all non-key frames corresponding to already-sent key frame (e.g., I frame) have already been read from the transmitting queue before the switching, and when it is necessary to read and send new key frame from the transmitting queue before the switching, and corresponding non-key frames are deleted from all queues except for the transmitting queue before the switching, not read the key frame from the transmitting queue before the switching any more, but begin to read and send the multimedia data frames from a new transmitting queue after the bit rate switching until next bit rate switching.

Embodiment 2 provides a method of a streaming media server adaptively providing the user with multiple bit rate streaming media in a video live play application scenario.

Figure 2:
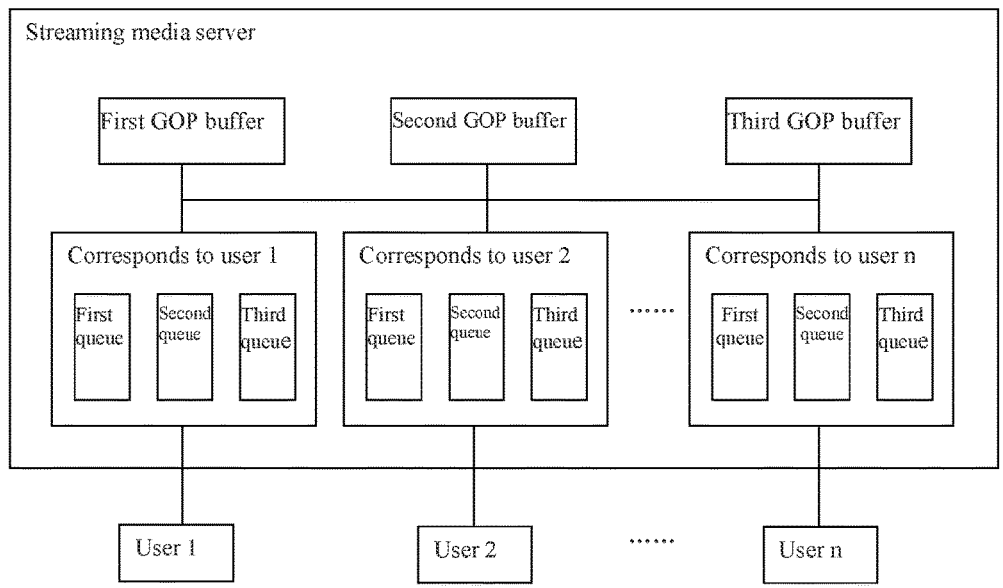
FIG. 2 is a schematic diagram of a method of a streaming media server adaptively providing the user with multiple bit rate streaming media in a video live play application scenario according to a second embodiment of the present disclosure.

In a video live play application scenario, suppose that the streaming media server respectively adaptively provide n(n>2) users (namely, user 1, user 2, . . . and user n) with streaming media service with three types of bit rate, an implementation mode of the streaming media server adaptively providing multiple bit rate streaming media is as shown in FIG. 2.

In FIG. 2, the streaming media server is provided with three GOP buffers with three types of bit rates, and three queues are set respectively for the user, namely, a first GOP buffer, a second GOP buffer, a third GOP buffer, a first queue, a second queue and a third queue; wherein the first GOP buffer and the first queue correspond to the first type of bit rate, the second GOP buffer and the second queue correspond to the second type of bit rate, the third GOP buffer and the third queue correspond to the third type of bit rate, the first bit rate is higher than the second bit rate, and the second bit rate is higher than the third bit rate.

In the present embodiment, the storage spaces of the three GOP buffers are distinct, but the number of video frames that can be stored in the three GOP buffers is the same. The storage spaces of the three queues are distinct, but the number of video frames that can be stored in three queues is the same.

The streaming media server performs transcoding processing for a video frame (namely, a multimedia data frame having a GOP structure) that is currently generated in real time and has a GOP structure after the encoding processing, so as to, for the video frame after the encoding processing, generate a video frame based on the first bit rate, a video frame based on the second bit rate, and a video frame based on the third bit rate.

In an example, the streaming media server may synchronously place video frames with different bit rates into a corresponding GOP buffer, i.e., the video frame based on the first bit rate is buffered in the first GOP buffer, the video frame based on the second bit rate is buffered in the second GOP buffer, and the video frame based on the third bit rate is buffered in the third GOP buffer. The streaming media server may control the number of video frames in three GOP buffers the same, and media content corresponding to video frames in the three GOP buffers completely the same.

As for any user in the network, the streaming media server may synchronously read the video frame from the first GOP buffer and place it in the first queue, read the video frame from the second GOP buffer and place it in the second queue, and read the video frame from the third GOP buffer and place it in the third queue. The streaming media server may control media content corresponding to video frames synchronously placed in three queues to be completely the same.

As for any user in the network, upon beginning to provide the user with media streaming played live this time, the steaming media server first considers one queue of three queues corresponding to the user as a transmitting queue, e.g., the streaming media server considers a corresponding queue as a transmitting queue based on default setting; again for example, the streaming media server considers a queue corresponding to the bit rate as a transmitting queue based on a bit rate selected by the user; further for example, the streaming media server considers a queue with a corresponding bit rate as a transmitting queue based on a current network transmission rate; the streaming media server reads the video frame from the transmitting queue (e.g., the second queue) and sends it to the user, and whenever a video frame is sent, the video frame is deleted from the transmitting queue, and the steaming media server may also delete video frames in the first queue and third queue with a bit rate different from the bit rate corresponding to the video frame. In a procedure of constantly reading and sending the video frame from the transmitting queue, the streaming media server monitors the data fill rate of the transmitting queue (a ratio of a storage space occupied by the video frame currently stored in the transmitting queue to a total storage space size of the transmitting queue). Upon monitoring that the data fill rate of the transmitting queue is higher than a first fill rate and a time period from the preceding bit rate switching reaches a predetermined time length, the streaming media server determines a need to switch to a lower bit rate, and the streaming media server considers the third queue as a new transmitting queue, and upon reading I frame from the second queue, begins to read and send video frame from the new transmitting queue (namely, the third queue), and likewise, the read video frame is deleted from the transmitting queue, and the streaming media server may also delete video frames in the first queue and second queue with a bit rate different from the bit rate corresponding to the video frame read from the third queue; Upon monitoring that the data fill rate of the transmitting queue is higher than a second fill rate and a time period from the preceding bit rate switching reaches a predetermined time length, the streaming media server determines a need to switch to a higher bit rate, and the streaming media server considers the second queue as a new transmitting queue, and upon reading I frame from the third queue, begins to read and send video frame from the new transmitting queue (namely, the second queue), and likewise, the read video frame is deleted from the transmitting queue, and the streaming media server may also delete video frames in the first queue and third queue with a bit rate different from the bit rate corresponding to the video frame read from the second queue.

Embodiment 3 provides a method of a streaming media server adaptively providing the user with multiple bit rate streaming media in a video telephone conference application scenario.

In a video telephone conference application scenario, suppose that the streaming media server respectively adaptively provide each participant of the video telephone conference with streaming media service with three types of bit rates. The streaming media server is provided with three GOP buffers, namely, a first GOP buffer, a second GOP buffer and a third GOP buffer, wherein the first GOP buffer corresponds to the first type of bit rate, the second GOP buffer corresponds to the second type of bit rate, the third GOP buffer corresponds to the third type of bit rate, the first bit rate is higher than the second bit rate, and the second bit rate is higher than the third bit rate.

When a user applies to participate the video telephone conference, the streaming media server configures corresponding information for the user, e.g., dynamically sets three queues for the user, namely, a first queue, a second queue and a third queue; wherein the first queue corresponds to the first type of bit rate, the second queue corresponds to the second type of bit rate, and the third queue corresponds to the third type of bit rate. In the present embodiment, the storage spaces of the three GOP buffers are distinct, but the number of video frames that can be stored in the three GOP buffers is the same. The storage spaces of the three queues are distinct, but the number of video frames that can be stored in three queues is the same.

After the streaming media server successfully configures corresponding information for the user, the user becomes a participant of the video telephone conference of this time. The streaming media server performs transcoding processing for a video frame that is currently generated in real time and has a GOP structure after the encoding processing, so as to, for the video frame after the encoding processing, generate a video frame based on the first bit rate, a video frame based on the second bit rate, and a video frame based on the third bit rate.

The streaming media server may synchronously place video frames with different bit rates into three GOP buffers, i.e., the video frame based on the first bit rate is buffered in the first GOP buffer, the video frame based on the second bit rate is buffered in the second GOP buffer, and the video frame based on the third bit rate is buffered in the third GOP buffer. The streaming media server may control the number of video frames in three GOP buffers the same, and media content corresponding to video frames in the three GOP buffers completely the same.

The streaming media server may synchronously read the video frame of the participant in the first GOP buffer and place it in the first queue, read the video frame from the second GOP buffer and place it in the second queue, and read the video frame from the third GOP buffer and place it in the third queue. The streaming media server may control media content corresponding to video frames synchronously placed in three queues to be completely the same.

Upon beginning to provide the participant with media streaming of the video telephone conference, the steaming media server first considers one queue corresponding to the bit rate as a transmitting queue based on the bit rate selected by the participant; the streaming media server reads the video frame from the transmitting queue (e.g., the third queue) and sends it to the participant, and whenever a video frame is sent, the video frame is deleted from the transmitting queue, and the steaming media server may also delete video frames in the first queue and second queue with a bit rate different from the bit rate corresponding to the video frame. In a procedure of constantly reading and sending the video frame from the transmitting queue, the streaming media server monitors the data fill rate of the transmitting queue. Upon monitoring that the data fill rate of the transmitting queue is higher than a first fill rate and a time period from the preceding bit rate switching reaches a predetermined time length, the streaming media server determines a need to switch to a lower bit rate; since the bit rate of the third queue is already a minimum bit rate, the streaming media server still considers the third queue as the transmitting queue, and continues to read and send video frame from the third queue; Upon monitoring that the data fill rate of the transmitting queue is higher than a second fill rate and a time period from the preceding bit rate switching reaches a predetermined time length, the streaming media server determines a need to switch to a higher bit rate, and the streaming media server considers the second queue as a new transmitting queue, and upon reading I frame from the third queue, begins to read and send video frame from the new transmitting queue (namely, the second queue), and likewise, the read video frame is deleted from the transmitting queue, and the streaming media server may also delete video frames in the first queue and third queue with a bit rate different from the bit rate corresponding to the video frame read from the second queue.

Embodiment 4 provides an apparatus for adaptively providing multiple bit rate streaming media in a server.

The server in the present embodiment is the streaming media server, and the apparatus for adaptively providing multiple bit rate streaming media is arranged in a computer device which serves as the streaming media server, for example, the apparatus for adaptively providing multiple bit rate streaming media disclosed in the present embodiment may be arranged in a desktop computer, a server and other network devices that may serve as the streaming media server. The apparatus for adaptively providing multiple bit rate streaming media in the present embodiment has main structures as shown in FIG. 3.

The apparatus for adaptively providing multiple bit rate streaming media in a server is described below with reference to specific embodiments.

Figure 3:
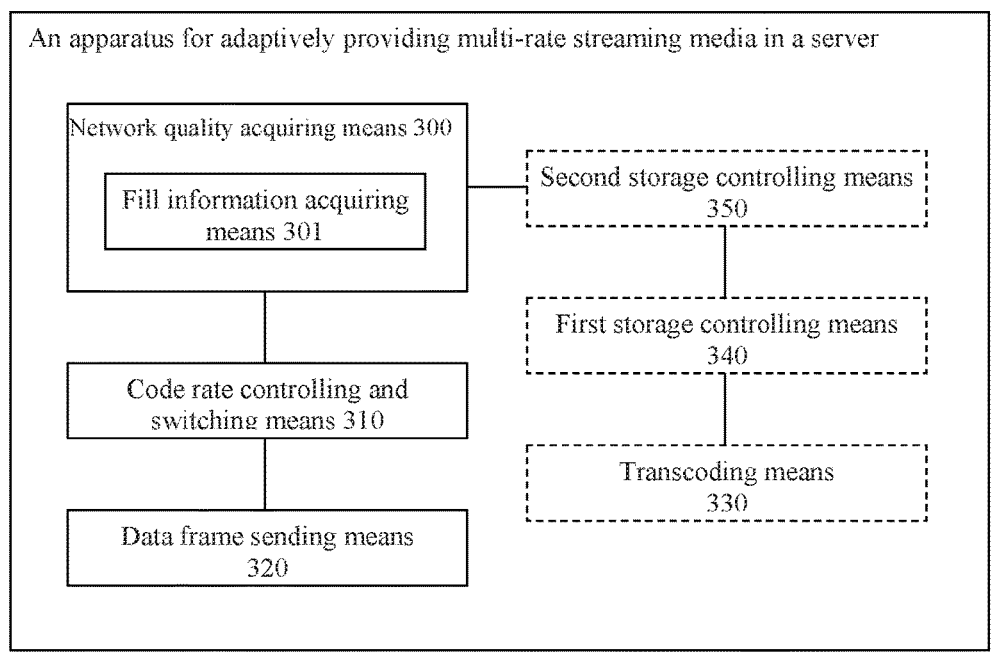
FIG. 3 is a structural schematic diagram of an apparatus for adaptively providing multiple bit rate streaming media in a server according to a fourth embodiment of the present disclosure.

In FIG. 3, the apparatus for adaptively providing multiple bit rate streaming media in the present embodiment comprises: means for obtaining network quality information (hereinafter referred to "network quality acquiring means 300"), means for selecting one queue from all queues as a transmitting queue in the case that it is determined based on the network quality information that bit rate switching is needed (hereinafter referred to as "bit rate controlling and switching means 310"), and means for reading the multimedia data frame from the transmitting queue and sending it, and deleting multimedia data frames in other queues having the same media content as the already-sent multimedia data frame (hereinafter referred to as "data frame sending means 320"); the network quality acquiring means may comprise: means for obtaining data fill information of a transmitting queue (hereafter referred to "fill information acquiring means 301"). Optionally, the apparatus for adaptively providing multiple bit rate streaming media in the present embodiment may further comprise: means for transcoding multimedia data frame after the encoding processing into multimedia data frames with different bit rates (hereinafter referred to "transcoding means 330"), means for storing transcoded multimedia data frames with different bit rates respectively into corresponding GOP buffers (hereinafter referred to "first storage controlling means 340") and means for synchronously reading multimedia data frames from respective GOP buffers and storing the read multimedia data respectively into corresponding queues (hereinafter referred to "second storage controlling means 350").

The network quality acquiring means 300 is mainly used to obtain the network quality information.

In an example, the network quality information acquired by network quality acquiring means 300 may comprise: network transmission delay, packet loss rate, and network jitter information. Preferably, the network quality information in the present embodiment may be reflected using data fill information of the queue, that is, the fill information acquiring means 301 obtains the data fill information of the queue.

In an example, the data fill information of the queue obtained by the fill information acquiring means 301 may be specifically a ratio (namely, a data fill rate) of a storage space size occupied by the multimedia data frame stored in the queue to a total storage space size of the queue, and the data fill information may also specifically be a queue parameter capable of reflecting network quality, such as the storage space size occupied by the multimedia data frame stored in the queue or the storage space size that is idle in the queue.

In an example, the fill information acquiring means 301 may acquire regularly (e.g., one second or less than one second) the data fill information of any one queue in all queues to acquire a current network state in time based on the data fill information of the queue. Said any one queue may be a randomly-determined queue or a predetermined fixed queue. That is, the fill information acquiring means 301 may randomly acquire data fill information of a certain queue, or fixedly acquire the data fill information of a certain queue. Preferably, the fill information acquiring means 301 may acquire regularly the data fill information of a transmitting queue among the queues, so that the fill information acquiring means 301 acquires the current network state in time based on the data fill information of the transmitting queue. In the present embodiment, the transmitting queue refers to a queue to which a multimedia data frame currently sent to the terminal equipment belongs. That is to say, although in the present embodiment a corresponding queue is respectively set for the multimedia data frame for different bit rates, and each queue stores the multimedia data frame with the corresponding bit rate, but, as for any moment, the multimedia data frame stored in one queue is transmitted to the terminal equipment and the queue is the transmitting queue.

The bit rate controlling and switching means 310 is mainly used to select one queue from all queues as a transmitting queue in the case that it is determined based on the network quality information that the bit rate switching is needed.

In an example, all multimedia data frames stored in different queues in the present embodiment have the same encoding format, e.g., all multimedia data frames stored in different queues have the same GOP structure. In addition, the multimedia data frames stored in different queues are synchronously updated; for example, in the case that the multimedia data frame employs a GOP structure, each type of bit rate is provided with a GOP buffer in the present embodiment; first, the transcoding means 330 performs transcoding processing for the multimedia data frames after having gone through encoding processing to obtain multimedia data frames with a plurality of different bit rates; then, the first storage controlling means 340 simultaneously writes multimedia data frames with different bit rates into the corresponding GOP buffer, for example, in the case that all GOP buffers are empty (GOP buffers are made empty since the multimedia data frames in the GOP buffers are placed in the queues, or GOP buffers are made empty due to a cleaning operation), the first storage controlling means 340 simultaneously writes the multimedia data frames with different bit rates after the transcoding processing into the corresponding GOP buffers; then, the second storage controlling means 350 simultaneously reads the same number of multimedia data frames from respective GOP buffers, and respectively stores the same number of read multimedia data frames in corresponding queues so that the multimedia data frame for the same media content are simultaneously increased in respective queues.

In an example, the data fill information of the queue obtained by the network quality acquiring means 300 comprises a data fill rate of the queue, and in the case that the number of multimedia data frames that can be stored in respective storage spaces of all queues is the same, a procedure of the bit rate controlling and switching means 310 determining that bit rate switching is needed based on the network quality information may specifically be as follows: pre-setting two uniform thresholds for all queues, namely, a first threshold and a second threshold, the bit rate controlling and switching means 310 obtaining a total storage space size of respective queues from pre-maintained information, and obtaining regularly a total storage space size occupied by all multimedia data frames currently stored in any queue of all queues (e.g., the bit rate controlling and switching means 310 obtains regularly a total storage space size occupied by all multimedia data frames currently stored in a transmitting queue), then, the bit rate controlling and switching means 310 calculating the data fill rate of the queue based on the total storage space size occupied by all multimedia data frames currently stored in the obtained queue and the total storage space size of the queue, and determining that it is necessary to switch to a lower bit rate when the data fill rate of the queue is judged higher than the first threshold; determining that it is necessary to switch to a higher bit rate when the data fill rate of the queue is judged lower than the second threshold. The first threshold is usually by far larger than the second threshold, e.g., the first threshold is 80%, whereas the second threshold is 20%.

In an example, the data fill information of the queue obtained by the network quality acquiring means 300 comprises a data fill rate of the queue, and in the case that the number of multimedia data frames that can be stored in respective storage spaces of all queues is different, a procedure of the bit rate controlling and switching means 310 determining that bit rate switching is needed based on the network quality information in the present embodiment may be: pre-setting two thresholds for each queue respectively, i.e., each queue corresponds to its respective first threshold and second threshold, first thresholds to which different queues correspond respectively are usually different, and likewise, second thresholds to which different queues correspond respectively are usually different; the bit rate controlling and switching means 310 obtaining, from pre-maintained information, a total storage space size of each queue and a first threshold and a second threshold to which each queue itself corresponds, and the bit rate controlling and switching means 310 obtaining regularly a total storage space size occupied by all multimedia data frames currently stored in any queue of all queues (e.g., the bit rate controlling and switching means 310 obtaining regularly a total storage space size occupied by all multimedia data frames currently stored in a transmitting queue), then, calculating the data fill rate of the queue based on the total storage space size occupied by all multimedia data currently stored in the obtained queue and the total storage space size of the queue, and the bit rate controlling and switching means 310 determining that it is necessary to switch to a lower bit rate when the data fill rate of the queue is judged higher than the first threshold to which the queue corresponds; the bit rate controlling and switching means 310 determining that it is necessary to switch to a higher bit rate when the data fill rate of the queue is judged lower than the second threshold to which the queue corresponds.

In an example, in the case that the network quality information in the present embodiment comprises a total storage space size occupied by all multimedia data frames currently stored in a queue, a procedure of the bit rate controlling and switching means 310 determining that bit rate switching is needed based on the network quality information in the present embodiment may be: no matter whether the number of multimedia data frames that can be stored in respective storage spaces of all queues is the same, pre-setting two thresholds for each queue, i.e., each queue corresponds to its respective third threshold and fourth threshold, third thresholds to which different queues correspond are usually different, and likewise, fourth thresholds to which different queues correspond are usually different; the bit rate controlling and switching means 310 obtaining, from pre-maintained information, a third threshold and a fourth threshold to which each queue itself corresponds, and the bit rate controlling and switching means 310 obtaining regularly a total storage space size occupied by all multimedia data frames currently stored in any queue of all queues (e.g., obtaining regularly a total storage space size occupied by all multimedia data frames currently stored in a transmitting queue), then, comparing the total storage space size occupied by all multimedia data frames currently stored in the obtained queue with the third threshold and fourth threshold to which the queue corresponds, and the bit rate controlling and switching means 310 determining that it is necessary to switch to a lower bit rate when the comparison result is that the total storage space size occupied by all multimedia data frames currently stored in the obtained queue is larger than the third threshold to which the queue corresponds; and the bit rate controlling and switching means 310 determining that it is necessary to switch to a higher bit rate when the comparison result is that the total storage space size occupied by all multimedia data frames currently stored in the obtained queue is smaller than the fourth threshold to which the queue corresponds. The third threshold is usually by far larger than the fourth threshold.

In an example, in the case that the network quality information in the present embodiment comprises a storage space size currently idle in the queue, a procedure of the bit rate controlling and switching means 310 determining that bit rate switching is needed based on the network quality information in the present embodiment may be: no matter whether the number of multimedia data frames that can be stored in respective storage spaces of all queues is the same, pre-setting two thresholds for each queue, i.e., each queue corresponds to its respective fifth threshold and sixth threshold, fifth thresholds to which different queues correspond respectively are usually different, and likewise, sixth thresholds to which different queues correspond respectively are usually different; the bit rate controlling and switching means 310 obtaining, from pre-maintained information, a fifth threshold and a sixth threshold to which each queue itself corresponds, and the bit rate controlling and switching means 310 obtaining regularly a storage space size currently idle in each queue in all queues (e.g., obtaining regularly a storage space size currently idle in a transmitting queue), and comparing the storage space size currently idle in the obtained queue with the fifth threshold and sixth threshold to which the queue corresponds, and the bit rate controlling and switching means 310 determining that it is necessary to switch to a higher bit rate when the comparison result is that the storage space size currently idle in the obtained queue is larger than the obtained fifth threshold; and the bit rate controlling and switching means 310 determining that it is necessary to switch to a lower bit rate when the comparison result is that the storage space size currently idle in the obtained queue is smaller than the sixth threshold. The fifth threshold is usually by far smaller than the sixth threshold.

In an example, to avoid frequent bit rate switching phenomenon caused by factors such as network jitter, upon judging it is necessary to switch bit rate, the bit rate controlling and switching means 310 considers constraint conditions for controlling frequent bit rate switching, that is to say, the bit rate controlling and switching means 310 may determine that the bit rate needs to be switched based on the network quality information and pre-set time constraint conditions for bit rate switching. The pre-set time constraint conditions for bit rate switching may specifically be that a time period from a preceding bit rate switching to current time exceeds a predetermined time length.

In an example, a first specific example of the bit rate controlling and switching means 310 determining that the bit rate needs to be switched based on the network quality information and the pre-set time constraint conditions for bit rate switching is: in the case that the number of multimedia data frames that can be stored in respective storage spaces of all queues is the same, pre-setting two uniform thresholds for all queues, namely, a first threshold and a second threshold, the bit rate controlling and switching means 310 obtaining a total storage space size, a predetermined time length and time of the preceding bit rate switching from pre-maintained information, and obtaining regularly a total storage space size occupied by all multimedia data frames currently stored in any queue of all queues, then, the bit rate controlling and switching means 310 calculating the data fill rate of the queue based on the total storage space size occupied by all multimedia data frames currently stored in the obtained any queue and the total storage space size of the queue, and the bit rate controlling and switching means 310 determining that it is necessary to switch to a lower bit rate when the data fill rate of the queue is judged higher than the first threshold and when a difference between the current time and the time of preceding bit rate switching exceeds a predetermined time length; the bit rate controlling and switching means 310 determining that it is necessary to switch to a higher bit rate when the data fill rate of the queue is judged lower than the second threshold and when a difference between the current time and the time of preceding bit rate switching exceeds a predetermined time length.

In an example, a second specific example of the bit rate controlling and switching means 310 determining that the bit rate needs to be switched based on the network quality information and the pre-set time constraint conditions for bit rate switching is: in the case that the number of multimedia data frames that can be stored in respective storage spaces of all queues is different, pre-setting two thresholds for each queue respectively, i.e., each queue corresponds to its respective first threshold and second threshold, first thresholds to which different queues correspond respectively are usually different, and likewise, second thresholds to which different queues correspond respectively are usually different; the bit rate controlling and switching means 310 obtaining, from pre-maintained information, a total storage space size of each queue, a first threshold and a second threshold to which each queue itself corresponds, a predetermined time length and time of the preceding bit rate switching, and the bit rate controlling and switching means 310 obtaining regularly a total storage space size occupied by all multimedia data frames currently stored in any queue of all queues (preferably, obtaining regularly a total storage space size occupied by all multimedia data frames currently stored in a transmitting queue), then, calculating the data fill rate of the queue based on the total storage space size occupied by all multimedia data currently stored in the obtained queue and the total storage space size of the queue, and the bit rate controlling and switching means 310 determining that it is necessary to switch to a lower bit rate when the data fill rate is judged higher than the first threshold to which the queue corresponds and when a difference between the current time and the time of preceding bit rate switching exceeds a predetermined time length; the bit rate controlling and switching means 310 determining that it is necessary to switch to a higher bit rate when the data fill rate is judged lower than the second threshold to which the queue corresponds and when the difference between the current time and the time of preceding bit rate switching exceeds a predetermined time length. The first threshold is usually by far larger than the second threshold, e.g., the first threshold is 80%, whereas the second threshold is 20%.

In an example, a third specific example of the bit rate controlling and switching means 310 determining that the bit rate needs to be switched based on the network quality information and the pre-set time constraint conditions for bit rate switching is: pre-setting two thresholds for each queue, i.e., each queue corresponds to its respective third threshold and fourth threshold, third thresholds to which different queues correspond are usually different, and likewise, fourth thresholds to which different queues correspond are usually different; the bit rate controlling and switching means 310 obtaining, from pre-maintained information, a third threshold and a fourth threshold to which each queue itself corresponds, a predetermined time length and time of the preceding bit rate switching, and the bit rate controlling and switching means 310 obtaining regularly a total storage space size occupied by all multimedia data frames currently stored in any queue of all queues (preferably, obtaining regularly a total storage space size occupied by all multimedia data frames currently stored in a transmitting queue), then, comparing the total storage space size occupied by all multimedia data frames currently stored in the obtained queue with the third threshold and fourth threshold to which the queue corresponds, and the bit rate controlling and switching means 310 determining that it is necessary to switch to a lower bit rate when the comparison result is that the total storage space size occupied by all multimedia data frames currently stored in the obtained queue is larger than the third threshold to which the queue corresponds and when the difference between the current time and the time of preceding bit rate switching exceeds a predetermined time length; and the bit rate controlling and switching means 310 determining that it is necessary to switch to a higher bit rate when the comparison result is that the total storage space size occupied by all multimedia data frames currently stored in the obtained queue is smaller than the fourth threshold to which the queue corresponds and when the difference between the current time and the time of preceding bit rate switching exceeds a predetermined time length. The third threshold is usually by far larger than the fourth threshold.

In an example, a fourth specific example of the bit rate controlling and switching means 310 determining that the bit rate needs to be switched based on the network quality information and the pre-set time constraint conditions for bit rate switching is: pre-setting two thresholds for each queue, i.e., each queue corresponds to its respective fifth threshold and sixth threshold, fifth thresholds to which different queues correspond respectively are usually different, and likewise, sixth thresholds to which different queues correspond respectively are usually different; the bit rate controlling and switching means 310 obtaining, from pre-maintained information, a fifth threshold and a sixth threshold to which each queue itself corresponds, a predetermined time length and time of the preceding bit rate switching, and the bit rate controlling and switching means 310 obtaining regularly a storage space size currently idle in each queue in all queues (preferably, obtaining regularly a storage space size currently idle in a transmitting queue), and comparing the storage space size currently idle in the obtained queue with the fifth threshold and sixth threshold to which the queue corresponds, and the bit rate controlling and switching means 310 determining that it is necessary to switch to a higher bit rate when the comparison result is that the storage space size currently idle in the obtained queue is larger than the obtained fifth threshold and when the difference between the current time and the time of preceding bit rate switching exceeds a predetermined time length; and the bit rate controlling and switching means 310 determining that it is necessary to switch to a lower bit rate when the comparison result is that the storage space size currently idle in the obtained queue is smaller than the sixth threshold and when the difference between the current time and the time of preceding bit rate switching exceeds a predetermined time length. The fifth threshold is usually by far smaller than the sixth threshold.

The data frame sending means 320 is mainly used to read the multimedia data frame from the transmitting queue and send it, and delete all multimedia data frames in other queues having the same media content as the already-sent multimedia data frame.

In an example, the data frame sending means 320 always reads and sends the multimedia data frame from the transmitting queue, and the multimedia data frame read and sent by the data frame sending means 320 from the transmitting queue is deleted from the transmitting queue; in the case that the bit rate controlling and switching means 310 determined that bit rate switching is needed, the data frame sending means 320 should read and send the multimedia data frame from a new transmitting queue after the switching.

In an example, when the multimedia data frame is read and sent by the data frame sending means 320 from the transmitting queue, the data frame sending means 320 should also synchronously delete corresponding multimedia data frames in other queues (namely, all remaining queues among all queues except for the transmitting queue) to ensure multimedia data frames at head of all queues always correspond to the same media content.

In an example, in the case that the bit rate controlling and switching means 310 determines that bit rate switching is needed, the data frame sending means 320 should note timing of reading and sending from the new transmitting queue after the switching. Specifically, in the case that the bit rate controlling and switching means 310 determines that bit rate switching is needed, when the data frame sending means 320 reads a key frame (e.g., I frame) from the transmitting queue before the switching, stops reading and sending the multimedia data frames from the transmitting queue before the switching, and reads and sends the multimedia data frames from the transmitting queue after the switching; In a specific example, when the bit rate controlling and switching means 310 determines that bit rate switching is needed, if a non-key frame (e.g., P frame or B frame) is being currently read and sent from the transmitting queue before the switching, wait until the data frame sending means 320 has already read all non-key frames corresponding to already-sent key frame (e.g., I frame) from the transmitting queue before the switching, and when it is necessary to read and send next key frame from the transmitting queue before the switching, and corresponding non-key frames are deleted from all queues except for the transmitting queue before the switching, the data frame sending means 320 does not read the key frame from the transmitting queue before the switching any more, but begins to read and send the multimedia data frames from a new transmitting queue after the bit rate switching until next bit rate switching.

It needs to be particularly appreciated that when the bit rate controlling and switching means 310 determines that it is necessary to switch to a lower bit rate, if the bit rate of the transmitting queue before the switching is already a minimum bit rate among bit rates of all queues, a new transmitting queue after the switching is still the transmitting queue before the switching; if the bit rate of the transmitting queue before the switching is not a minimum bit rate among bit rates of all queues, the bit rate controlling and switching means 310 should select a queue from all queues whose bit rates are lower than the bit rate of the transmitting queue before the switching as the transmitting queue, e.g., the bit rate controlling and switching means 310 selects a queue with a minimum bit rate from all queues whose bit rates are lower than the bit rate of the transmitting queue before the switching as the transmitting queue. When the bit rate controlling and switching means 310 determines that it is necessary to switch to a higher bit rate in the present embodiment, if the bit rate of the transmitting queue before the switching is already a maximum bit rate among bit rates of all queues, a new transmitting queue after the switching is still the transmitting queue before the switching; if the bit rate of the transmitting queue before the switching is not a maximum bit rate among bit rates of all queues, the bit rate controlling and switching means 310a should select a queue from all queues whose bit rates are higher than the bit rate of the transmitting queue before the switching as the transmitting queue, e.g., the bit rate controlling and switching means 310a selects a queue with a maximum bit rate from all queues whose bit rates are higher than the bit rate of the transmitting queue before the switching as the transmitting queue.

Embodiment 5 provides an implementation mode of a streaming media server adaptively providing the user with multiple bit rate streaming media in a video live play application scenario.

In a video live play application scenario, suppose that the streaming media server respectively adaptively provides n(n>2) users (namely, user 1, user 2, . . . and user n) with streaming media service with three types of bit rate. The streaming media server is provided with three GOP buffers with three types of bit rates, and three queues are set respectively for the user, namely, a first GOP buffer, a second GOP buffer, a third GOP buffer, a first queue, a second queue and a third queue; wherein the first GOP buffer and the first queue correspond to the first type of bit rate, the second GOP buffer and the second queue correspond to the second type of bit rate, the third GOP buffer and the third queue correspond to the third type of bit rate, the first bit rate is higher than the second bit rate, and the second bit rate is higher than the third bit rate. The storage spaces of the three GOP buffers are distinct, but the number of video frames that can be stored in the three GOP buffers is the same. The storage spaces of the three queues are distinct, but the number of video frames that can be stored in three queues is the same.

The transcoding means 330 performs transcoding processing for a video frame (namely, a multimedia data frame having a GOP structure) that is currently generated in real time and has a GOP structure after the encoding processing, so as to, for the video frame after the encoding processing, generate a video frame based on the first bit rate, a video frame based on the second bit rate, and a video frame based on the third bit rate.

The first storage controlling means 340 may synchronously place video frames with different bit rates into a corresponding GOP buffer, i.e., the video frame based on the first bit rate is buffered in the first GOP buffer, the video frame based on the second bit rate is buffered in the second GOP buffer, and the video frame based on the third bit rate is buffered in the third GOP buffer. The streaming media server may control the number of video frames in three GOP buffers the same, and media content corresponding to video frames in the three GOP buffers completely the same.

As for any user in the network, the second storage controlling means 350 may synchronously read the video frame from the first GOP buffer and place it in the first queue, read the video frame from the second GOP buffer and place it in the second queue, and read the video frame from the third GOP buffer and place it in the third queue. The second storage controlling means 350 may control media content corresponding to video frames synchronously placed in three queues to be completely the same.

As for any user in the network, upon beginning to provide the user with media streaming played live this time, the data frame sending means 320 first considers one queue of three queues corresponding to the user as a transmitting queue, e.g., considers a corresponding queue as a transmitting queue based on default setting; again for example, considers a queue corresponding to the bit rate as a transmitting queue based on a bit rate selected by the user; further for example, the data frame sending means 320 considers a queue with a corresponding bit rate as a transmitting queue based on a current network transmission rate; the data frame sending means 320 reads the video frame from the transmitting queue (e.g., the second queue) and sends it to the user, and whenever a video frame is sent, the video frame is deleted from the transmitting queue, and the data frame sending means 320 may also delete video frames in the first queue and third queue with a bit rate different from the bit rate corresponding to the video frame. In a procedure of the data frame sending means 320 constantly reading and sending the video frame from the transmitting queue, the bit rate controlling and switching means 310 monitors the data fill rate of the transmitting queue obtained by the network quality acquiring means 300 (a ratio of a storage space occupied by the video frame currently stored in the transmitting queue to a total storage space size of the transmitting queue). Upon monitoring that the data fill rate of the transmitting queue is higher than a first fill rate and a time period from the preceding bit rate switching reaches a predetermined time length, the bit rate controlling and switching means 310 determines a need to switch to a lower bit rate, and the bit rate controlling and switching means 310 considers the third queue as a new transmitting queue, and upon reading I frame from the second queue, the data frame sending means 320 begins to read and send video frame from the new transmitting queue (namely, the third queue), and likewise, the video frame read by the data frame sending means 320 is deleted from the transmitting queue, and the data frame sending means 320 may also delete video frames in the first queue and second queue with a bit rate different from the bit rate corresponding to the video frame read from the third queue; Upon monitoring that the data fill rate of the transmitting queue is higher than a second fill rate and a time period from the preceding bit rate switching reaches a predetermined time length, the bit rate controlling and switching means 310 determines a need to switch to a higher bit rate, and the data frame sending means 320 considers the second queue as a new transmitting queue, and upon reading I frame from the third queue, the data frame sending means 320 begins to read and send video frame from the new transmitting queue (namely, the second queue), and likewise, the video frame read by the data frame sending means 320 is deleted from the transmitting queue, and the data frame sending means 320 may also delete video frames in the first queue and third queue with a bit rate different from the bit rate corresponding to the video frame read from the second queue.

Embodiment 6 provides an implementation mode of a streaming media server adaptively providing the user with multiple bit rate streaming media in a video telephone conference application scenario.

In a video telephone conference application scenario, suppose that the streaming media server respectively adaptively provide each participant of the video telephone conference with streaming media service with three types of bit rates. The streaming media server is provided with three GOP buffers, namely, a first GOP buffer, a second GOP buffer and a third GOP buffer, wherein the first GOP buffer corresponds to the first type of bit rate, the second GOP buffer corresponds to the second type of bit rate, the third GOP buffer corresponds to the third type of bit rate, the first bit rate is higher than the second bit rate, and the second bit rate is higher than the third bit rate.

When a user applies to participate the video telephone conference, the streaming media server configures corresponding information for the user, e.g., dynamically sets three queues for the user, namely, a first queue, a second queue and a third queue; wherein the first queue corresponds to the first type of bit rate, the second queue corresponds to the second type of bit rate, and the third queue corresponds to the third type of bit rate. In the present embodiment, the storage spaces of the three GOP buffers are distinct, but the number of video frames that can be stored in the three GOP buffers is the same. The storage spaces of the three queues are distinct, but the number of video frames that can be stored in three queues is the same.

After the streaming media server successfully configures corresponding information for the user, the user becomes a participant of the video telephone conference of this time. The transcoding means 330 performs transcoding processing for a video frame that is currently generated in real time and has a GOP structure after the encoding processing, so as to, for the video frame after the encoding processing, generate a video frame based on the first bit rate, a video frame based on the second bit rate, and a video frame based on the third bit rate.

The first storage controlling means 340 may synchronously place video frames with different bit rates into three GOP buffers, i.e., the video frame based on the first bit rate is buffered in the first GOP buffer, the video frame based on the second bit rate is buffered in the second GOP buffer, and the video frame based on the third bit rate is buffered in the third GOP buffer. The first storage controlling means 340 may control the number of video frames in three GOP buffers the same, and media content corresponding to video frames in the three GOP buffers completely the same.

The second storage controlling means 350 may synchronously read the video frame of the participant in the first GOP buffer and place it in the first queue, read the video frame from the second GOP buffer and place it in the second queue, and read the video frame from the third GOP buffer and place it in the third queue. The second storage controlling means 350 may control media content corresponding to video frames synchronously placed in three queues to be completely the same.

Upon beginning to provide the participant with media streaming of the video telephone conference, the data frame sending means 320 first considers one queue corresponding to the bit rate as a transmitting queue based on the bit rate selected by the participant; the data frame sending means 320 reads the video frame from the transmitting queue (e.g., the third queue) and sends it to the participant, and whenever a video frame is sent, the video frame is deleted from the transmitting queue, and the data frame sending means 320 may also delete video frames in the first queue and second queue with a bit rate different from the bit rate corresponding to the video frame. In a procedure of the data frame sending means 320 constantly reading and sending the video frame from the transmitting queue, the bit rate controlling and switching means 310 monitors the data fill rate of the transmitting queue obtained by the network quality acquiring means 300. Upon monitoring that the data fill rate of the transmitting queue is higher than a first fill rate and a time period from the preceding bit rate switching reaches a predetermined time length, the bit rate controlling and switching means 310 determines a need to switch to a lower bit rate; since the bit rate of the third queue is already a minimum bit rate, the bit rate controlling and switching means 310 still considers the third queue as the transmitting queue, and the data frame sending means 320 continues to read and send video frame from the third queue; Upon monitoring that the data fill rate of the transmitting queue is higher than a second fill rate and a time period from the preceding bit rate switching reaches a predetermined time length, the bit rate controlling and switching means 310 determines a need to switch to a higher bit rate, and the bit rate controlling and switching means 310 considers the second queue as a new transmitting queue, and upon reading I frame from the third queue, the data frame sending means 320 begins to read and send video frame from the new transmitting queue (namely, the second queue), and likewise, the video frame read by the data frame sending means 320 is deleted from the transmitting queue, and the data frame sending means 320 may also delete video frames in the first queue and third queue with a bit rate different from the bit rate corresponding to the video frame read from the second queue.

It should be noted that the present disclosure may be implemented in software and/or a combination of software and hardware. For example, various modules according to the present disclosure may be implemented by an application-specific integrated circuit (ASIC) or any other similar hardware devices. In one embodiment, the software program of the present disclosure may be executed by a processor to perform the above steps or functions. Likewise, the software JO program of the present disclosure (including the relevant data structure) may be stored in a computer-readable recording medium, e.g., RAM memory, magnetic or optical driver or soft floppy or a similar device. Additionally, some steps or functions of the present disclosure may be implemented using hardware, e.g., as a circuit cooperating with the processor t perform various functions or steps.

To those skilled in the art, it is apparent that the present disclosure is not limited to the details of the above exemplary embodiments, and the present disclosure may be implemented with other embodiments without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

Although exemplary embodiments are particularly shown and described, those skilled in the art appreciate that changes may occur with them in respect of their forms and details without departing from the spirit and scope of claims. The protection searched herein is expounded in the appended claims.

What is claimed is:

1. A method for adaptively providing multiple bit rate streaming media in a server, the method comprising:
   acquiring network quality information;
   after determining a need to switch a bit rate based on the network quality information, selecting a queue from queues as a transmitting queue, the queues storing multimedia data frames with different bit rates, media content of the multimedia data frames stored in the respective queues being identical; and
   reading the multimedia data frame from the transmitting queue, sending the multimedia data frame, and deleting multimedia data frames in other queues having the identical media content as the sent multimedia data frame, wherein the deleting are synchronously performed,
   wherein the reading the multimedia data frame from the transmitting queue and sending the multimedia data frame comprises:
   when needing to read, from a transmitting queue before a switching, a key frame in the multimedia data frame and send the key frame, starting to read, from a transmitting queue after the switching, the multimedia data frame and to send the multimedia data frame.

2. The method for adaptively providing multiple bit rate streaming media according to claim 1, wherein the network quality information comprises: a data fill rate of the queues.

3. The method for adaptively providing multiple bit rate streaming media according to claim 2, wherein the acquiring the network quality information comprises:
   acquiring the data fill rate of the transmitting queue.

4. The method for adaptively providing multiple bit rate streaming media according to claim 2, wherein the determining a need to switch a bit rate based on the network quality information comprises:
   determining a need to switch to a lower bit rate when the data fill rate is higher than a first threshold; and
   determining a need to switch to a higher bit rate when the data fill rate is lower than a second threshold;
   wherein the first threshold is higher than the second threshold.

5. The method for adaptively providing multiple bit rate streaming media according to claim 2, wherein the determining a need to switch a bit rate based on the network quality information comprises:
   determining a need to switch to a lower bit rate when the data fill rate is higher than a first threshold and a time period from a preceding bit rate switching to current time exceeds a predetermined time length; and
   determining a need to switch to a higher bit rate when the data fill rate is lower than a second threshold and a time period from a preceding bit rate switching to current time exceeds a predetermined time length;
   wherein the first threshold is higher than the second threshold.

6. The method for adaptively providing multiple bit rate streaming media according to claim 1, wherein the multimedia data frames stored in the queues have an identical GOP (group of pictures) structure.

7. The method for adaptively providing multiple bit rate streaming media according to claim 6, wherein a bit rate corresponds to a GOP buffer, the method further comprising:
   transcoding multimedia data frames after the encoding process into the multimedia data frames with the different bit rates;
   storing the transcoded multimedia data frames with the different bit rates respectively into corresponding GOP buffers; and
   synchronously reading the multimedia data frames from respective GOP buffers and storing the read multimedia data respectively into corresponding queues.

8. The method for adaptively providing multiple bit rate streaming media according to claim 1, wherein a number of the multimedia data frames that can be stored in storage spaces of the queues is the same, and the storage spaces of the queues are equal to or greater than the storage spaces occupied by two multimedia data frames.

9. An apparatus for adaptively providing multiple bit rate streaming media in a server, comprising:
at least one processor; and
a memory storing instructions, which when executed by the at least one processor, cause the at least one processor to perform operations, the operations comprising:
acquiring network quality information;
after determining a need to switch a bit rate based on the network quality information, selecting a queue from queues as a transmitting queue, the queues storing multimedia data frames with different bit rates, media content of the multimedia data frames stored in the respective queues being identical; and
reading the multimedia data frame from the transmitting queue, sending the multimedia data frame, and deleting multimedia data frames in other queues having the identical media content as the sent multimedia data frame, wherein the deleting are synchronously performed,
wherein the reading the multimedia data frame from the transmitting queue and sending the multimedia data frame comprises:
when needing to read, from a transmitting queue before a switching, a key frame in the multimedia data frame and send the key frame, starting to read, from a transmitting queue after the switching, the multimedia data frame and to send the multimedia data frame.

10. The apparatus for adaptively providing multiple bit rate streaming media according to claim 9, wherein the network quality information comprises: a data fill rate of the queues.

11. The apparatus for adaptively providing multiple bit rate streaming media according to claim 10, wherein the acquiring the network quality information comprises:
acquiring the data fill rate of the transmitting queue.

12. The apparatus for adaptively providing multiple bit rate streaming media according to claim 10, wherein the selecting a queue from queues as a transmitting queue, after determining a need to switch a bit rate based on the network quality information specifically comprises:
determining a need to switch to a lower bit rate when the data fill rate is higher than a first threshold; and
determining a need to switch to a higher bit rate when the data fill rate is lower than a second threshold;
wherein the first threshold is higher than the second threshold.

13. The apparatus for adaptively providing multiple bit rate streaming media according to claim 10, wherein the selecting a queue from queues as a transmitting queue, after determining a need to switch a bit rate based on the network quality information specifically comprises:
determining a need to switch to a lower bit rate when the data fill rate is higher than a first threshold and a time period from a preceding bit rate switching to current time exceeds a predetermined time length; and
determining a need to switch to a higher bit rate when the data fill rate is lower than a second threshold and a time period from a preceding bit rate switching to current time exceeds a predetermined time length;
wherein the first threshold is higher than the second threshold.

14. The apparatus for adaptively providing multiple bit rate streaming media according to claim 9, wherein the multimedia data frames stored in the queues have an identical GOP (group of pictures) structure.

15. The apparatus for adaptively providing multiple bit rate streaming media according to claim 14, wherein each type of bit rate corresponds to a GOP buffer, the operations further comprising:
transcoding multimedia data frames after the encoding processing into the multimedia data frames with the different bit rates;
storing the transcoded multimedia data frames with the different bit rates respectively into corresponding GOP buffers;
synchronously reading the multimedia data frames from respective GOP buffers and storing the read multimedia data respectively into corresponding queues.

16. The apparatus for adaptively providing multiple bit rate streaming media according to claim 9, wherein a number of the multimedia data frames that can be stored in storage spaces of the queues is the same, and the storage spaces of the queues are equal to or greater than the storage spaces occupied by two multimedia data frames.

17. A non-transitory computer storage medium storing a computer program, which when executed by one or more processors, cause the one or more processors to perform operations, the operations comprising:
acquiring network quality information;
after determining a need to switch a bit rate based on the network quality information, selecting a queue from queues as a transmitting queue, the queues storing multimedia data frames with different bit rates, media content of the multimedia data frames stored in the respective queues being identical; and
reading the multimedia data frame from the transmitting queue, sending the multimedia data frame, and deleting multimedia data frames in other queues having the identical media content as the sent multimedia data frame, wherein the deleting are synchronously performed,
wherein the reading the multimedia data frame from the transmitting queue and sending the multimedia data frame comprises:
when needing to read, from a transmitting queue before a switching, a key frame in the multimedia data frame and send the key frame, starting to read, from a transmitting queue after the switching, the multimedia data frame and to send the multimedia data frame.

18. The non-transitory computer storage medium according to claim 17, wherein, wherein the network quality information comprises: a data fill rate of the queues.

* * * * *